UNITED STATES PATENT OFFICE.

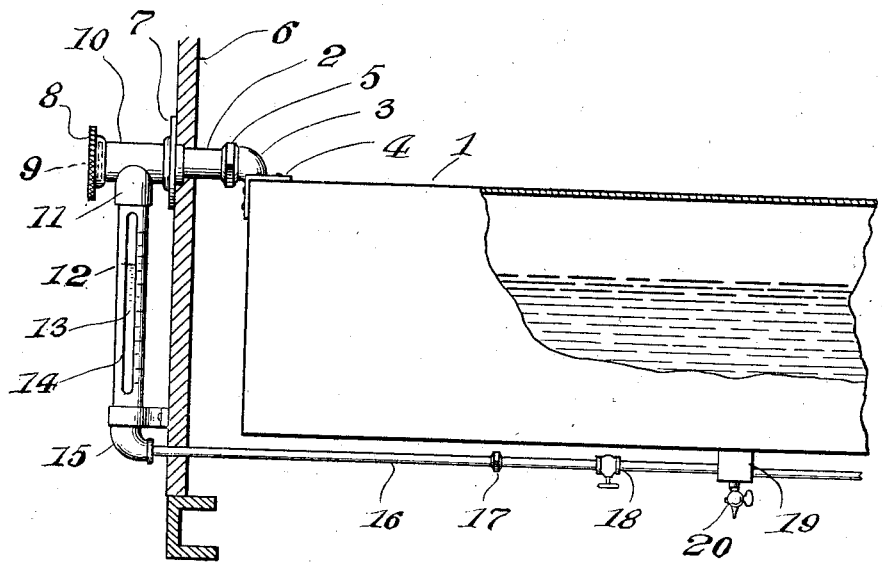

LEONORA BOYCE, OF YOAKUM, TEXAS.

GASOLENE-TANK FILLER AND GAGE.

1,217,693.      Specification of Letters Patent.     Patented Feb. 27, 1917.

Application filed March 7, 1916. Serial No. 82,770.

*To all whom it may concern:*

Be it known that I, LEONORA BOYCE, a citizen of the United States, residing at Yoakum, in the county of Dewitt and State of Texas, have invented new and useful Improvements in Gasolene-Tank Fillers and Gages, of which the following is a specification.

This invention relates to gasolene tank fillers and gages, the object in view being to provide novel means for filling the gasolene tank of a motor vehicle combined with a sight gage whereby the level of gasolene in the tank may be observed at a glance from the exterior of the body, further enabling the owner or operator of the car to immediately calculate the number of gallons, for example, placed in the tank thus insuring the full measure of gasolene or other liquid for which payment is made at the time.

With the above and other objects in view, the invention consists in the novel construction, combination and arrangement of parts, as herein described, illustrated and claimed.

The accompanying drawing represents a fragmentary vertical transverse section through an automobile, showing the gasolene tank thereof, and the apparatus of this invention in its applied relation thereto.

Referring to the drawing, 1 designates a gasolene tank which is shown as provided with a filling pipe 2 the inner end of which is connected by a tubular elbow 3 to the upper edge of the tank 1, the elbow 3 having an angle flange 4 adapting it to be readily secured to the upper edge of the tank by solder or mechanical fastening means as may be preferred. The elbow 3 and the pipe 2 are connected by means of a union 5 to enable the parts to be assembled.

The pipe 2 passes through an opening in the side 6 of the body to the outer face of which is fastened an ornamental or escutcheon plate 7. Outside of the plate 7 the pipe 2 extends sufficiently to receive a sealing cap 8 threaded thereon and containing an imperforate gasket 9 to prevent leakage. The projecting portion of the pipe 2 is preferably in the form of a T, the upper horizontal part 10 of which is connected by screw threading with the main pipe section 2 while the depending portion 11 thereof is internally threaded to receive the threaded upper extremity of a casing tube 12 in which is placed a sight gage glass 13, the tube 12 being formed with an observation slot 14 extending longitudinally thereof. The lower end of the tubular casing 12 is connected by screw threading to an elbow 15 which in turn has a screw threaded connection with a relatively small level equalizing pipe 16. This pipe 16 is preferably made in sections connected by a threaded union 17 to provide for assembling the parts readily and is also equipped with a stop cock 18. The end of the pipe 16 communicates with a sediment chamber 19 extending downwardly from and in communication with the bottom of the tank 1, the sediment from the chamber 19 being drawn off at suitable intervals by means of a drain cock 20.

In order to introduce gasolene or other liquid into the tank 1, the cap 8 is removed and the discharge end of a pipe or funnel is inserted in the open end of the T 10, the gasolene passing from said pipe or funnel through the T and pipe 2 into the tank 1. Simultaneously, the level of gasolene in the tank 1 is disclosed in the sight gage which is arranged upon the outside of the body of the vehicle, being shown as provided with attaching ears 21 through which fasteners may be inserted into the adjacent side 6 of the body of the vehicle.

The device hereinabove described renders it unnecessary for a person seated over the gasolene tank to dismount from the machine and also renders unnecessary the lifting of the large seat cushion and tank covering door. It is only necessary to remove the cap 8 and force the gasolene through the inlet pipe into the tank 1. The exact level of gasolene in the tank 1 from time to time is displayed in the sight gage located exteriorly of the body. The gasket 9 in the cap 8 insures a tight joint and prevents the escape of gasolene or other liquid from the tank and the connections associated therewith.

Having thus described my invention, I claim:—

The combination with the fuel supply tank of a motor vehicle, of a filling pipe communicating at one end directly with the top of said tank and having its other end portion extended laterally through the vehicle body, a tubular T connected to the receiving end of said pipe and arranged exteriorly of the vehicle body, a sealing cap for the receiving end of said T, a sight gage having its upper end in communication with said T, and a level equalizing pipe of relatively small capacity connecting the lower end of said sight gage with the bottom of the tank.

In testimony whereof I affix my signature in presence of two witnesses.

MRS. LEONORA BOYCE.

Witnesses:
 DORA JOURDÉ,
 THOS. SMOOT.